United States Patent
Wang

(10) Patent No.: US 9,277,575 B2
(45) Date of Patent: *Mar. 1, 2016

(54) METHOD, DEVICE AND NETWORK SYSTEM OF ESTABLISHING A TUNNEL

(71) Applicant: Huawei Technologies Co., Ltd., Shenzhen (CN)

(72) Inventor: Lili Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/558,030

(22) Filed: Dec. 2, 2014

(65) Prior Publication Data

US 2015/0098324 A1 Apr. 9, 2015

Related U.S. Application Data

(63) Continuation of application No. 13/548,036, filed on Jul. 12, 2012, now Pat. No. 8,929,214, which is a continuation of application No. PCT/CN2010/075790, filed on Aug. 9, 2010.

(30) Foreign Application Priority Data

Jan. 13, 2010 (CN) .......................... 2010 1 0001236

(51) Int. Cl.
*H04W 76/02* (2009.01)
*H04L 12/28* (2006.01)
(Continued)

(52) U.S. Cl.
CPC ........... *H04W 76/022* (2013.01); *H04L 12/287* (2013.01); *H04L 12/4633* (2013.01);
(Continued)

(58) Field of Classification Search
CPC . H04W 76/022; H04W 76/045; H04W 48/06; H04W 48/08; H04W 48/10; H04W 84/12; H04L 61/2015; H04L 12/287; H04L 12/4633
See application file for complete search history.

(56) References Cited

U.S. PATENT DOCUMENTS

2004/0264435 A1 12/2004 Chari et al.
2006/0056448 A1 3/2006 Zaki et al.
(Continued)

FOREIGN PATENT DOCUMENTS

CN 1426201 A 6/2003
CN 1913475 A 2/2007
(Continued)

OTHER PUBLICATIONS

"Information technology; Telecommunications and information exchange between systems; Local and metropolitan area networks; Specific requirements; Part 11: Wireless LAN Medium Access Control (MAC) and Physical Layer (PHY) specifications," International Standard ISO/IEC 8802-11, IEEE Std 802.11, Second Edition, Institute of Electrical and Electronics Engineers, New York, New York (Aug. 1, 2005).

(Continued)

*Primary Examiner* — Paul H Masur
(74) *Attorney, Agent, or Firm* — Leydig, Voit & Mayer, Ltd.

(57) ABSTRACT

A method, a device, and a network system of establishing a tunnel are provided in embodiments of the present disclosure. The method of establishing the tunnel includes: obtaining, by a WTP, an address of an AC and an address of a BRAS from a DHCP server; using, by the WTP, the address of the AC to establish a CAPWAP control tunnel with the AC; and using, by the WTP, the address of the BRAS to establish a CAPWAP data tunnel with the BRAS. By using the technical scheme provided in the embodiments of the present disclosure, the CAPWAP data tunnel may be established between the WTP and the BRAS.

15 Claims, 4 Drawing Sheets

(51) Int. Cl.
*H04L 12/46* (2006.01)
*H04L 29/12* (2006.01)
*H04W 48/06* (2009.01)
*H04W 48/08* (2009.01)
*H04W 48/10* (2009.01)
H04W 76/04 (2009.01)
H04W 84/12 (2009.01)

(52) U.S. Cl.
CPC ............ *H04L61/2015* (2013.01); *H04W 48/06* (2013.01); *H04W 48/08* (2013.01); *H04W 48/10* (2013.01); *H04W 76/045* (2013.01); *H04W 84/12* (2013.01)

(56) References Cited

U.S. PATENT DOCUMENTS

| | | | |
|---|---|---|---|
| 2007/0064673 A1* | 3/2007 | Bhandaru et al. | 370/351 |
| 2007/0206537 A1 | 9/2007 | Cam-Winget et al. | |
| 2007/0250713 A1 | 10/2007 | Rahman et al. | |
| 2007/0268516 A1* | 11/2007 | Bugwadia et al. | 358/1.15 |
| 2007/0274290 A1 | 11/2007 | Takahashi et al. | |
| 2008/0043637 A1 | 2/2008 | Rahman | |
| 2008/0089305 A1 | 4/2008 | Yao et al. | |
| 2008/0225853 A1* | 9/2008 | Melman | H04L 12/4625 370/392 |
| 2008/0240049 A1 | 10/2008 | Gaur | |
| 2008/0304456 A1 | 12/2008 | Iino et al. | |
| 2009/0054037 A1 | 2/2009 | Kaippallimalil | |
| 2009/0055898 A1 | 2/2009 | Kaippallimalil | |
| 2009/0086689 A1 | 4/2009 | Hunt et al. | |
| 2009/0141694 A1 | 6/2009 | Shi | |
| 2009/0168788 A1 | 7/2009 | Den et al. | |
| 2009/0290489 A1 | 11/2009 | Wang et al. | |
| 2009/0290537 A1 | 11/2009 | Berglund et al. | |
| 2011/0103344 A1 | 5/2011 | Gundavelli et al. | |
| 2012/0275303 A1 | 11/2012 | Wang | |

FOREIGN PATENT DOCUMENTS

| | | |
|---|---|---|
| CN | 1972231 A | 5/2007 |
| CN | 101133598 A | 2/2008 |
| CN | 101578828 A | 11/2009 |
| CN | 101621852 A | 1/2010 |
| CN | 101771612 A | 7/2010 |
| EP | 1494395 A1 | 1/2005 |
| EP | 1758307 A1 | 2/2007 |
| JP | 2006050520 A | 2/2006 |
| JP | 2008512965 A | 3/2006 |
| WO | 2006031671 A2 | 3/2006 |
| WO | 2006093392 A1 | 9/2006 |
| WO | 2009026839 A1 | 3/2009 |
| WO | 2009030282 A1 | 3/2009 |
| WO | 2009026848 A1 | 5/2009 |
| WO | 2011085586 A1 | 7/2011 |

OTHER PUBLICATIONS

"Information technology; Telecommunications and information exchange between systems; Local and metropolitan area networks; Specific requirements; Part 3: Carrier sense multiple access with collision detection (CSMA/CD) access method and physical layer specifications," International Standard ISO/IEC 8802-3, IEEE Std 802.3, 2000 Edition, Institute of Electrical and Electronics Engineers, New York, New York (2000).

"IEEE Standard for Information technology; Telecommunications and information exchange between systems; Local and metropolitan area networks; Specifics requirements; Part 11: Wireless LAN Medium Access Control (MAC) and Physical Layer (PHY) Specifications," ANSI/IEEE Std 802.11, 1999 Edition, Institute of Electrical and Electronics Engineers, New York, New York (1999).

"Information technology; Telecommunications and information exchange between systems; Local and metropolitan area networks; Specific requirements; Part11: Wireless LAN Medium Access Control (MAC) and Physical Layer (PHY) specifications," IEEE Std 802.11-1997, Institute of Electrical and Electronics Engineers, New York, New York (Jun. 26, 1997).

Meng, "Centralized WLAN Architecture Based on CAPWAP Protocol," Physical Electrical Information School of Ningxia University (Sep. 2009).

Calhoun et al., "Control and Provisioning of Wireless Access Points (CAPWAP) Protocol Specification," Network Working Group, Request for Comments: 5415, Internet Society, Reston, Virginia (Mar. 2009).

Yang et al., "Architecture Taxonomy for Control and Provisioning of Wireless Access Points (CAPWAP)," Network Working Group, Request for Comments: 4118, Internet Society, Reston, Virginia (Jun. 2005).

Calhoun, "Control and Provisioning of Wireless Access Points (CAPWAP) Access Controller DHCP Option," Network Working Group, Request for Comments: 5417, Internet Society, Reston, Virginia (Mar. 2009).

Office Action in corresponding U.S. Appl. No. 13/548,036 (Dec. 26, 2013).

* cited by examiner

METHOD, DEVICE AND NETWORK SYSTEM OF ESTABLISHING A TUNNEL

CROSS-REFERENCE TO RELATED APPLICATIONS

This application is a continuation of U.S. patent application Ser. No. 13/548,036, filed on Jul. 12, 2012, now U.S. Pat. No. 8,929,214, issued on Jan. 6, 2015, which is a continuation of International Patent Application No. PCT/CN2010/075790, filed on Aug. 9, 2010, which claims priority to Chinese Patent Application No. 201010001236.9, filed on Jan. 13, 2010, both of which are hereby incorporated by reference in their entireties.

FIELD OF THE DISCLOSURE

The present disclosure relates to a communications technology field, and in particular, to a method, a device, and a network system of establishing a tunnel.

BACKGROUND OF THE DISCLOSURE

At present, people may use the Wireless Local Area Network (WLAN) technology to access the Internet. FIG. 1 shows a WLAN access mode provided in the prior art. Wherein, a wireless termination point (Wireless Termination Point, WTP) and an access controller (Access Control, AC) transfer control messages and data streams by using the Control and Provisioning of Wireless Access Points protocol (Control and Provisioning of Wireless Access Points, CAPWAP).

In such an access mode, the WTP obtains an IP (Internet Protocol) address of the AC from a dynamic host configuration protocol (Dynamic Host Configuration Protocol, DHCP) server, and establishes a CAPWAP control tunnel with the AC. The WTP downloads configuration information such as software version, radio frequency, and power from the AC through the CAPWAP control tunnel, performs relevant configuration by using the configuration information, and establishes a CAPWAP data tunnel with the AC. When a terminal device needs to access the Internet, the terminal device initiates an access request through a wireless network adapter to the WTP. The WTP sends the access request through the CAPWAP data tunnel to the AC. The AC sends the access request to a broadband remote access server (Broadband Remote Access Server, BRAS). The BRAS performs access authentication on the terminal device. After the authentication is passed, the BRAS notifies the WTP through the AC of the successful access authentication of the terminal device. The WTP establishes an air interface data channel with the terminal device, which marks a success of Internet access of the terminal device.

During implementation of the present disclosure, the inventor finds the following:

The AC device is a low-end switch architecture, and does not support data processing in the case of heavy traffic. When a large number of terminal devices want to access the Internet, the existing AC becomes a bottleneck for terminals to access the Internet.

SUMMARY OF THE DISCLOSURE

A method, a device, and a network system of establishing a tunnel are provided in embodiments of the present disclosure to establish a CAPWAP data tunnel between WTP and BRAS.

As such, the embodiments of the present disclosure provide:

a method of establishing a tunnel, including:
obtaining, by a wireless termination point WTP, an address of an access control point AC and an address of a broadband remote access server BRAS from a dynamic host configuration protocol DHCP server;
using, by the WTP, the address of the AC to establish a Control and Provisioning of Wireless Access Points protocol CAPWAP control tunnel with the AC; and
using, by the WTP, the address of the BRAS to establish a CAPWAP data tunnel with the BRAS;
a device of establishing a tunnel, including:
an obtaining unit, configured to obtain an address of an AC and an address of a BRAS from a DHCP server;
a control tunnel establishing unit, configured to use the address of the AC to establish a CAPWAP control tunnel with the AC; and
a data tunnel establishing unit, configured to use the address of the BRAS to establish a CAPWAP data tunnel with the BRAS; and
a network system, including a WTP, an AC and a BRAS, where:
the WTP, configured to: obtain an address of an AC and an address of a BRAS from a DHCP server; use the address of the AC to establish a CAPWAP control tunnel with the AC; and use the address of the BRAS to establish a CAPWAP data tunnel with the BRAS;
the AC, configured to establish the CAPWAP control tunnel with the WTP; and
the BRAS, configured to establish the CAPWAP data tunnel with the WTP.

According to the embodiments of the present disclosure, a CAPWAP control tunnel is established between a WTP and an AC, and a CAPWAP data tunnel is established between the WTP and a BRAS. In this way, the AC may manage the WTP through the CAPWAP control tunnel, and the CAPWAP data tunnel may be used to transmit data of a terminal to the BRAS, thereby solving the problem in the prior art that the AC may not process a large volume of data when a large number of terminals access the Internet.

BRIEF DESCRIPTION OF THE DRAWINGS

To make the technical solution of the present disclosure clearer, the accompanying drawings for illustrating the embodiments of the present disclosure or the prior art are briefly introduced below. Apparently, the accompanying drawings are for the exemplary purpose of some embodiments of the present disclosure only, and person skilled in the art may derive other drawings from the accompanying drawings without creative efforts.

DETAILED DESCRIPTION OF THE EMBODIMENTS

Figure 1:
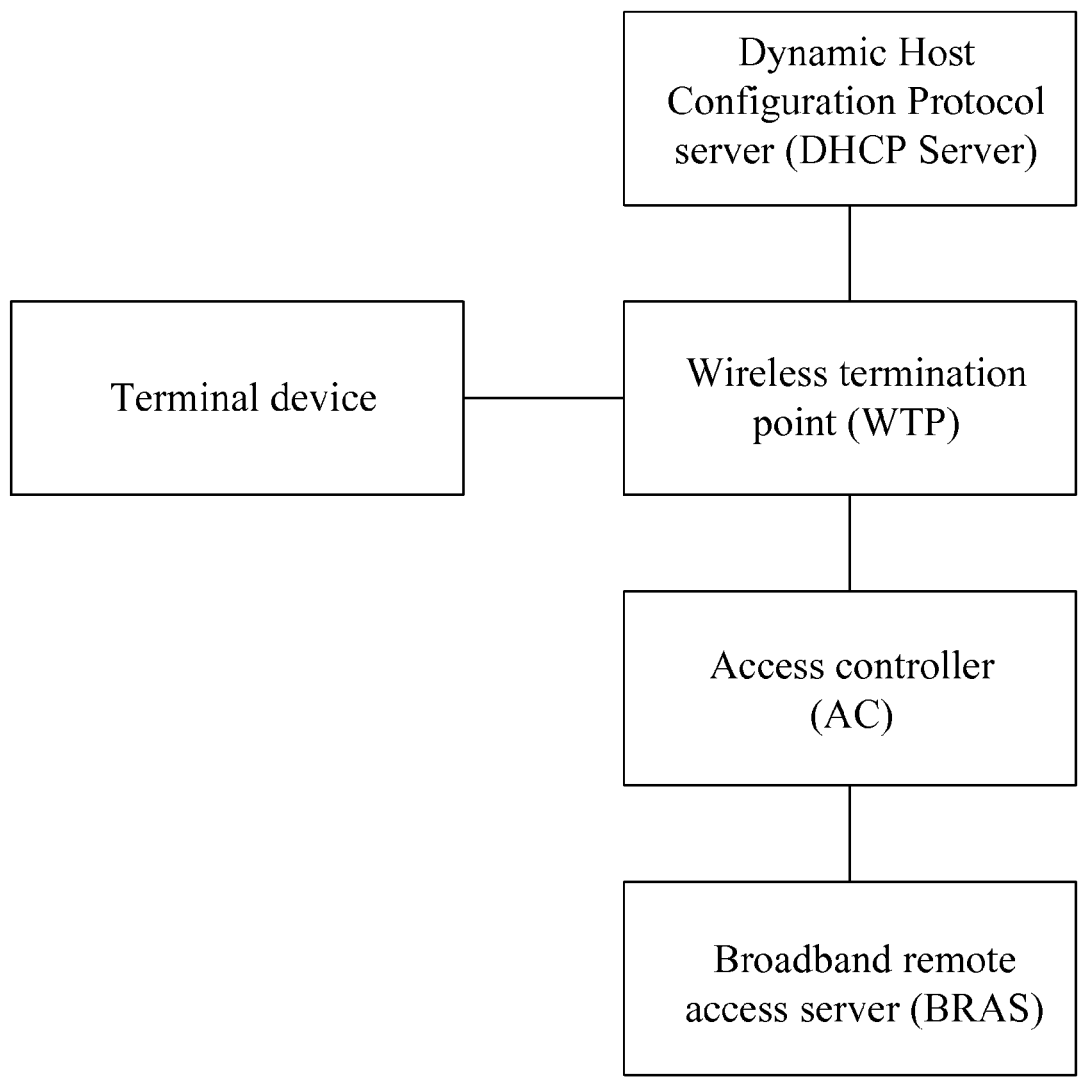
FIG. 1 is a schematic diagram of a WLAN access mode provided in the prior art.
Figure 2:
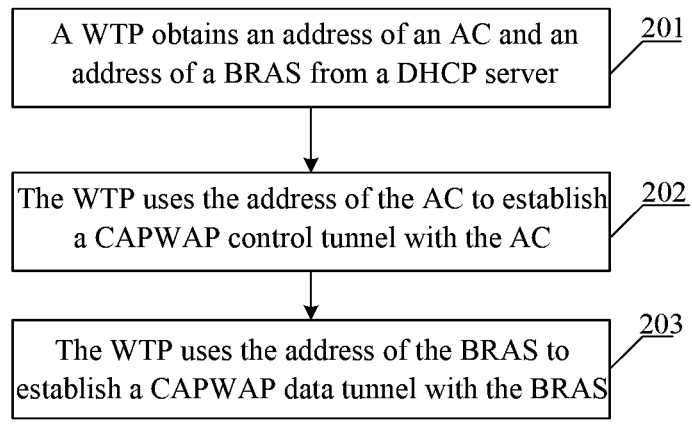
FIG. 2 is a flowchart of a method of establishing a tunnel provided in an embodiment of the present disclosure.

FIG. 2 is a flowchart of a method of establishing a tunnel provided in an embodiment of the present disclosure. The method includes:

201: A WTP obtains an address of an AC and an address of a BRAS from a DHCP server.

The WTP uses a DHCP protocol message to exchange information with the DHCP server to obtain the address of the AC and the address of the BRAS;

Specifically, the WTP broadcasts a dynamic host configuration protocol discover (DHCP Discover) message. Multiple DHCP servers send dynamic host configuration protocol offer (DHCP Offer) messages to the WTP. The DHCP Offer messages carry the addresses of ACs and the addresses of BRASs. The WTP selects the DHCP server that manages the WTP, sends a dynamic host configuration protocol request (DHCP Request) message to the selected DHCP server, and receives a dynamic host configuration protocol acknowledgment (DHCP ACK) message from the DHCP server. The DHCP ACK message carries the address of the AC and address of the BRAS. Generally, the WTP selects the DHCP server, which is corresponding to the DHCP Offer message first received by the WTP, as the DHCP server that manages the WTP.

202: The WTP uses the address of the AC to establish a CAPWAP control tunnel with the AC.

After the CAPWAP control tunnel is established, the WTP uses the CAPWAP control tunnel to obtain management control information from the AC. The management control information includes configuration information such as software version, radio frequency, and power. The WTP uses the management control information to make relevant configuration, so that the WTP may stay in the working status.

203: The WTP uses the address of the BRAS to establish a CAPWAP data tunnel with the BRAS.

According to the embodiments of the present disclosure, a CAPWAP control tunnel is established between a WTP and an AC, and a CAPWAP data tunnel is established between the WTP and a BRAS. In this way, the AC may manage the WTP through the CAPWAP control tunnel, and the CAPWAP data tunnel may be used to transmit data of a terminal to the BRAS directly, thereby solving the problem in the prior art that the AC may not process a large volume of data when a large number of terminals access the Internet.

Figure 3:
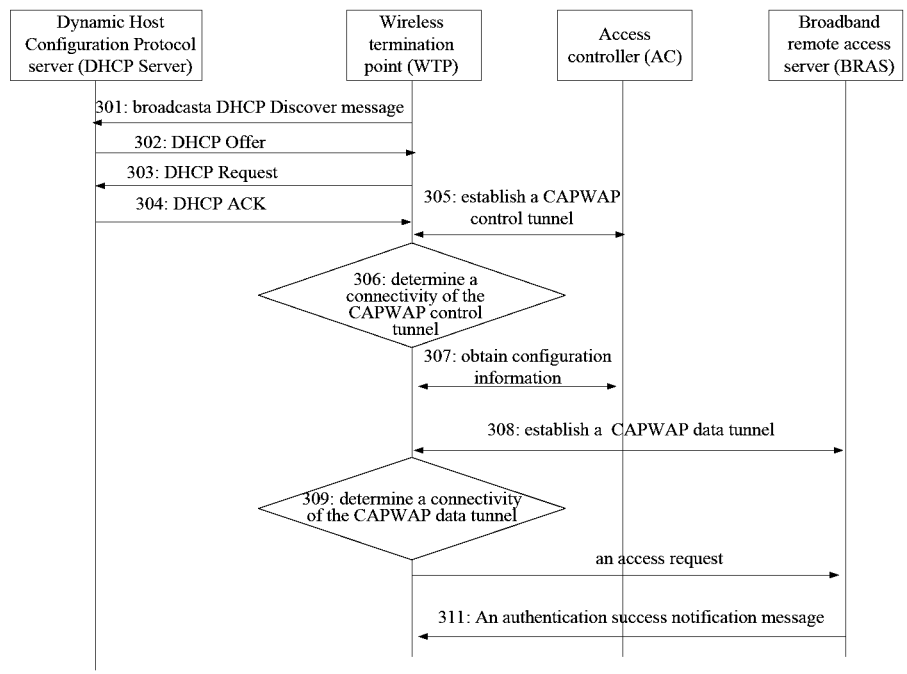
FIG. 3 is a schematic diagram of a method of establishing a tunnel provided in another embodiment of the present disclosure.

To describe the technical scheme provided in embodiments of the present disclosure more clearly, a method of establishing a tunnel is provided in another embodiment of the present disclosure as shown in FIG. 3. The method specifically includes:

301: The WTP broadcasts a DHCP Discover message.

302: The WTP receives DHCP Offer messages from multiple DHCP servers, where the DHCP Offer messages carry an AC address list and a BRAS address list that are corresponding to the DHCP servers.

The AC address and BRAS address on each DHCP server are configured during network construction. Each DHCP server may be configured with one AC address and one BRAS address, or may be configured with multiple AC addresses and multiple BRAS addresses.

Specifically, an option (Option) in a DHCP Offer message may be modified, so that the Option in the DHCP Offer message carries the AC address list and BRAS address list.

303: The WTP selects a DHCP server that manages the WTP, and sends a DHCP Request message to the selected DHCP server.

Generally, the WTP selects the DHCP server, which is corresponding to the DHCP Offer message first received by the WTP, as the DHCP server that manages the WTP.

304: The WTP receives a DHCP ACK message from the DHCP server, where the DHCP ACK message carries the AC address list and BRAS address list.

Specifically, an Option in a DHCP Offer message may be modified, so that the Option in the DHCP Offer message carries the AC address list and BRAS address list.

Figure 4:
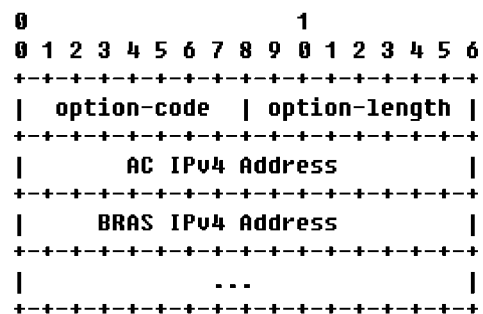
FIG. 4 shows a format of an Option provided in an embodiment of the present disclosure.
Figure 5:
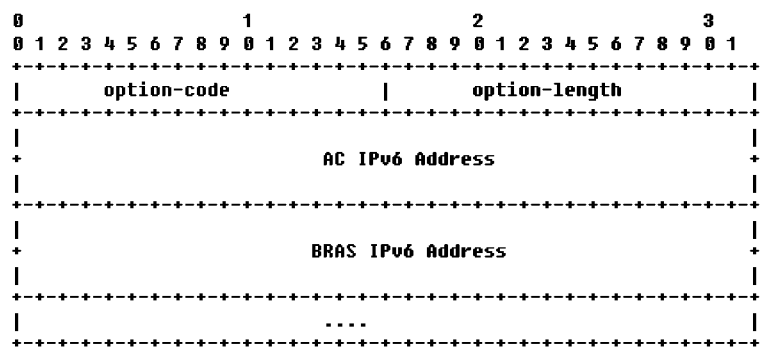
FIG. 5 shows a format of another Option provided in an embodiment of the present disclosure.

FIG. 4 shows a format of the Option in the DHCP Offer message or DHCP ACK message of a DHCPv4; FIG. 5 shows a format of the Option in the DHCP Offer message or DHCP ACK message of a DHCPv6.

305: The WTP uses the address of the AC to establish a CAPWAP control tunnel with the AC.

If the AC address list in the Option in the DHCP Offer message at step 302 and the Option in the DHCP ACK message at step 304 carries multiple AC addresses, the WTP selects an AC address from the AC address list. Generally, the WTP selects the first AC address in the AC address list. If the CAPWAP control tunnel fails to be established with the AC corresponding to the first AC address at step 305, a next AC address is selected to establish a CAPWAP control tunnel with the AC corresponding to the AC address.

306: The WTP sends a first keep alive (KEEPALIVE) packet to the AC through the CAPWAP control tunnel according to a first preset period, determines whether a response packet to the first KEEPALIVE packet is received from the AC within a specific period, and determines that the CAPWAP control tunnel is connected if yes, or determines that the CAPWAP control tunnel is not connected if not.

For example, if the first preset period is five minutes, the WTP sends the first keep alive (KEEPALIVE) packet to the AC through the CAPWAP control tunnel every five minutes to determine the connectivity of the CAPWAP control tunnel.

307: The WTP obtains configuration information such as software version, radio frequency, and power from the AC when the CAPWAP control tunnel is connected, and uses the configuration information to make relevant configuration, so that the WTP stays in the working status.

308: The WTP uses the address of the BRAS to establish a CAPWAP data tunnel with the BRAS.

If the BRAS address list in the Option in the DHCP Offer message at step 302 and the Option in the DHCP ACK message at step 304 carries multiple BRAS addresses, the WTP selects a BRAS address from the BRAS address list. Generally, the WTP selects the first BRAS address in the BRAS address list. If the CAPWAP data tunnel fails to be established with the BRAS corresponding to the first BRAS address at step 308, a next BRAS address is selected to establish a CAPWAP data tunnel with the BRAS corresponding to the BRAS address.

309: The WTP sends a second keep alive (KEEPALIVE) packet to the BRAS through the CAPWAP data tunnel according to a second preset period, determines whether a response packet to the second keep alive packet is received from the BRAS within a specific period, and determines that the CAPWAP data tunnel is connected if yes, or determines that the CAPWAP data tunnel is not connected if not.

For example, if the second preset period is six minutes, the WTP sends the second keep alive (KEEPALIVE) packet to the BRAS through the CAPWAP data tunnel every six minutes to determine the connectivity of the CAPWAP data tunnel.

The first preset period may be the same as or different from the second preset period, which does not affect the implementation of the present disclosure.

310: The WTP receive an access request sent by a terminal, and sends the access request through the CAPWAP data tunnel to the BRAS when the CAPWAP data tunnel is connected.

311: The BRAS performs an access authentication on the terminal, and sends an authentication success notification message to the WTP through the CAPWAP data tunnel after authentication is passed, subsequently the terminal may use the CAPWAP data tunnel to transmit data packets of the terminal to the BRAS to access the Internet network.

During the working process, the WTP may periodically check the connectivity of the CAPWAP control tunnel and CAPWAP data tunnel. Specifically, the WTP sends a first keep alive packet to the AC through the CAPWAP control tunnel according to a first preset period, determines whether a response packet to the first keep alive packet is received from the AC within a specific period. If yes, the WTP determines that the CAPWAP control tunnel is connected, so that the WTP uses the CAPWAP control tunnel to exchange management control information with the AC subsequently; if not, the WTP determines that the CAPWAP control tunnel is not connected and the WTP is controlled not to exchange management control information with the AC. For example, subsequently, the AC dynamically adjusts transmit power of the WTP according to network traffic. When the CAPWAP control tunnel is not connected, the WTP does not exchange information with the AC and thus may not obtain post-adjusted transmit power of the WTP. In addition, the WTP is controlled not to send data packets of the terminal to the BRAS. When it is determined that the CAPWAP control tunnel is connected during subsequent check on the connectivity of the CAPWAP control tunnel, the WTP may exchange the management control information with the AC and send data packets of the terminal to the BRAS. The WTP sends the second keep alive packet to the BRAS through the CAPWAP data tunnel according to a second preset period, determines whether a response packet to the second keep alive packet is received from the BRAS within a specific period. If yes, the WTP determines that the CAPWAP data tunnel is connected, so that the WTP exchanges data packets with the BRAS subsequently; if not, the WTP determines that the CAPWAP data tunnel is not connected and the WTP is controlled not to send data packets to the BRAS. When it is determined that the CAPWAP data tunnel is connected during subsequent check on the connectivity of the CAPWAP data tunnel, the WTP may send data packets of the terminal to the BRAS.

According to the embodiments of the present disclosure, a CAPWAP control tunnel is established between a WTP and an AC, and a CAPWAP data tunnel is established between the WTP and a BRAS. In this way, the AC may manage the WTP through the CAPWAP control tunnel, and the WTP may use the CAPWAP data tunnel to transmit data of a terminal to the BRAS, thereby solving the problem in the prior art that the AC may not process a large volume of data when a large number of terminals access the Internet.

Figure 6:
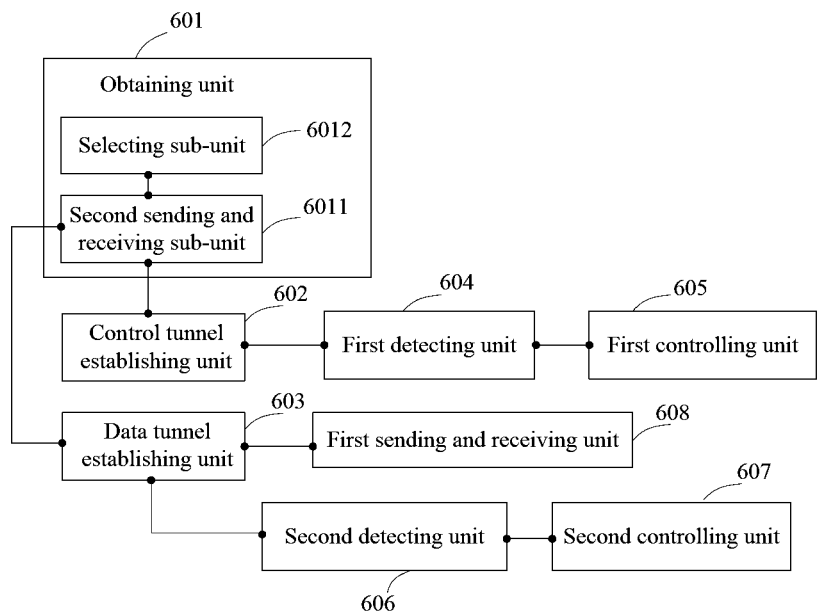
FIG. 6 shows a structure of a device of establishing a tunnel provided in an embodiment of the present disclosure.

A device of establishing a tunnel is provided in an embodiment of the present disclosure as shown in FIG. 6. The device includes:

an obtaining unit 601, configured to obtain an address of an AC and an address of a BRAS from a DHCP server;

a control tunnel establishing unit 602, configured to use the address of the AC to establish a CAPWAP control tunnel with the AC; and a data tunnel establishing unit 603, configured to use the address of the BRAS to establish a CAPWAP data tunnel with the BRAS.

The device further includes:

a first detecting unit 604, configured to: send a first keep alive packet to the AC through the CAPWAP control tunnel according to a first preset period; determine whether a response packet to the first keep alive packet is received from the AC within a specific period; and determine that the CAPWAP control tunnel is connected if yes, or determine that the CAPWAP control tunnel is not connected if not;

a first controlling unit 605, configured to: when the CAPWAP control tunnel is not connected, control not to exchange control management information with the AC through the CAPWAP control tunnel and control not to send data packets to the BRAS through the CAPWAP data tunnel;

a second detecting unit 606, configured to: send a second keep alive packet to the BRAS through the CAPWAP data tunnel according to a second preset period; determine whether a response packet to the second keep alive packet is received from the BRAS within a specific period; and determine that the CAPWAP data tunnel is connected if yes, or determine that the CAPWAP data tunnel is not connected if not;

a second controlling unit 607, configured to control not to send data packets to the BRAS through the CAPWAP data tunnel when the CAPWAP data tunnel is not connected; and a first sending and receiving unit 608, configured to: when the CAPWAP data tunnel is connected, send data packets from a terminal to the BRAS through an established CAPWAP data tunnel; and/or, send data packets from the BRAS to the terminal through the established CAPWAP data tunnel; send an access request of the terminal to the BRAS through the CAPWAP data tunnel, and receive an authentication success notification message of the access request sent by the BRAS through the CAPWAP data tunnel.

Specifically, the obtaining unit 601 includes a second sending and receiving sub-unit 6011 and a selecting sub-unit 6012, where:

the second sending and receiving sub-unit 6011 is configured to: broadcast a DHCP Discover message; receive DHCP Offer messages sent by multiple DHCP servers; send a DHCP Request message to a DHCP server selected by the selecting sub-unit 6012; and receive a DHCP ACK message sent by the selected DHCP server; where a DHCP Offer message includes an AC address and a BRAS address that are corresponding to a DHCP server, and/or, the DHCP ACK message includes the AC address and BRAS address that are corresponding to the DHCP server; and the selecting sub-unit 6012 is configured to select a DHCP server for managing a WTP, from the multiple DHCP servers after receiving the DHCP Offer messages sent by the multiple DHCP servers.

According to the embodiments of the present disclosure, a CAPWAP control tunnel is established between a WTP and an AC, and a CAPWAP data tunnel is established between the WTP and a BRAS. In this way, the AC may manage the WTP through the CAPWAP control tunnel, and the CAPWAP data tunnel may be used to transmit directly data of a terminal to the BRAS, thereby solving the problem in the prior art that the AC may not process a large volume of data when a large number of terminals access the Internet.

Figure 7:
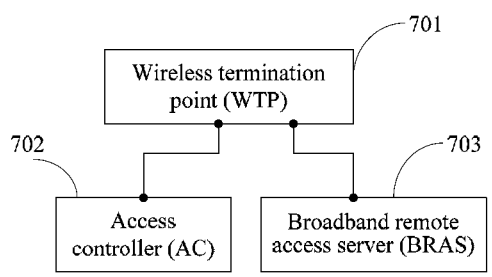
FIG. 7 shows a structure of a network system provided in an embodiment of the present disclosure.

A network system is provided in an embodiment of the present disclosure as shown in FIG. 7. The network system includes a WTP 701, an AC 702, and a BRAS 703, where:

the WTP 701 is configured to: obtain an address of an AC and an address of a BRAS from a DHCP server; use the address of the AC to establish a CAPWAP control tunnel with the AC; and use the address of the BRAS to establish a CAPWAP data tunnel with the BRAS;

the AC 702 is configured to establish the CAPWAP control tunnel with the WTP; and the BRAS 703 is configured to establish the CAPWAP data tunnel with the WTP.

The functions of the WTP 701, AC 702, and BRAS 703 are described in the preceding method embodiments, and are not repeated here.

Optionally, the WTP 701 receives an access request from a terminal, and sends the access request to the BRAS through the CAPWAP data tunnel; the BRAS 703 performs an access authentication on the terminal, and after authentication is passed, sends an authentication success notification message to the WTP through the CAPWAP data tunnel, so that the terminal uses the CAPWAP data tunnel to transmit data packets of the terminal to the BRAS.

The WTP 701 is also configured to send data packets from the terminal to the BRAS through the established CAPWAP data tunnel, and send data packets from the BRAS to the terminal through the established CAPWAP data tunnel.

Optionally, the WTP 701 is also configured to send a first keep alive packet to the AC through the CAPWAP control tunnel according to a first preset period; determine whether a response packet to the first keep alive packet is received from the AC within a specific period; determine that the CAPWAP control tunnel is connected if yes, or determine that the CAPWAP control tunnel is not connected if not; and when the CAPWAP control tunnel is not connected, control not to exchange control management information with the AC through the CAPWAP control tunnel and control not to send data packets to the BRAS through the CAPWAP data tunnel.

Optionally, the WTP 701 is configured to send a second keep alive packet to the BRAS through the CAPWAP data tunnel according to a second preset period; determine whether a response packet to the second keep alive packet is received from the BRAS within a specific period; determine that the CAPWAP data tunnel is connected if yes, determine that the CAPWAP data tunnel is not connected if not; and when the CAPWAP data tunnel is not connected, control not to send data packets to the BRAS through the CAPWAP data tunnel.

According to the embodiments of the present disclosure, a CAPWAP control tunnel is established between a WTP and an AC, and a CAPWAP data tunnel is established between the WTP and a BRAS. In this way, the AC may manage the WTP through the CAPWAP control tunnel, and the CAPWAP data tunnel may be used to transmit directly data of a terminal to the BRAS, thereby solving the problem in the prior art that the AC cannot process a large volume of data when a large number of terminals access the Internet.

Those killed in the art may complete all or part of the steps in the preceding method in the embodiments by using a program to instruct relevant hardware. The program may be stored in a storage medium, such as read only memory, disk, and compact disk, which may be read by a computer.

A method of establishing a tunnel, a device and a network system are provided in detail in the preceding embodiments of the present disclosure. Specific examples are adapted for illustration of the principles and implementation methods of the present disclosure in the disclosure. The description of these examples is adapted to help understand the method and its core ideas in the embodiment of the present disclosure. Those skilled in the art may make various modifications and variations to the disclosure according to the ideas of the present disclosure. In a word, the contents of the description do not intend to limit the present disclosure.

What is claimed is:

1. A method of mitigating a bottleneck effect of an access control point (AC), at a wireless termination point (WTP) in a mobile communication network that uses the AC to access the internet, when a large number of terminal devices want to access the Internet by establishing a tunnel, the method comprising:

obtaining, by the WTP, an address of the AC and an address of an access device, wherein the access device is used to perform access authentication on a terminal device when the access device receives, through the WTP, an access request sent by the terminal device;

using, by the WTP, the address of the AC to establish a control and provisioning of wireless access points protocol (CAPWAP) control tunnel with the AC; and using, by the WTP, the address of the access device to establish a CAPWAP data tunnel with the access device.

2. The method of claim 1 further comprising:

sending, by the WTP, a first keep alive packet to the AC through the CAPWAP control tunnel according to a first preset period;

determining, by the WTP, whether a response packet to the first keep alive packet is received from the AC within a specific period, wherein if it is not received, the method further comprises;

determining, by the WTP, that the CAPWAP control tunnel is not connected;

deciding, by the WTP, not to exchange control management information with the AC through the CAPWAP control tunnel; and deciding, by the WTP, not to send a data packet of a terminal to the access device through the CAPWAP data tunnel.

3. The method of claim 2 further comprising:

sending, by the WTP, a second keep alive packet to the access device through the CAPWAP data tunnel according to a second preset period;

determining, by the WTP, whether a response packet to the second keep alive packet is received from the access device within a specific period, wherein if it is not received, the method further comprises;

determining, by the WTP, that the CAPWAP data tunnel is not connected; and deciding, by the WTP, not to send a data packet of the terminal to the BRAS access device through the CAPWAP data tunnel.

4. The method of claim 2, further comprising:

determining, by the WTP, that the CAPWAP data tunnel is connected; and sending, by the WTP, a data packet from the terminal to the access device through an established CAPWAP data tunnel; or sending, by the WTP, a data packet from the access device to the terminal through the established CAPWAP data tunnel when the CAPWAP data tunnel is connected; or both.

5. The method of claim 4, further comprising:

receiving, by the WTP, an access request sent by the terminal, sending the access request to the access device through the CAPWAP data tunnel; and receiving, by the WTP, an authentication success notification message corresponding to the access request sent by the access device through the CAPWAP data tunnel.

6. The method of claim 1, wherein the WTP obtains the address of the AC and the address of the access device from a dynamic host configuration protocol (DHCP) server, which comprises:

broadcasting, by the WTP, a dynamic host configuration protocol discover (DHCP Discover) message;

receiving, by the WTP, dynamic host configuration protocol offer (DHCP Offer) messages sent by multiple DHCP servers;

selecting, by the WTP, a DHCP server that manages the WTP, and sending a dynamic host configuration protocol request (DHCP Request) message to a selected DHCP server; and receiving, by the WTP, a dynamic host configuration protocol acknowledge (DHCP ACK) message sent by the selected DHCP server, wherein the DHCP Offer message comprises an AC address and a access device address that are corresponding to a DHCP server, and/or, the DHCP ACK message comprises the AC address and the access device address that are corresponding to the DHCP server.

7. The method of claim 1, further comprising:

sending, by the WTP, a second keep alive packet to the access device through the CAPWAP data tunnel according to a second preset period;

determining, by the WTP, whether a response packet to the second keep alive packet is received from the access device within a specific period; determine that the CAPWAP data tunnel is connected if yes; if not, determine that the CAPWAP data tunnel is not connected, and control not to send a data packet of a terminal to the access device through the CAPWAP data tunnel.

8. The method of claim 7, further comprising:

receiving, by the WTP, an access request sent by the terminal;

sending, by the WTP, the access request to the access device through the CAPWAP data tunnel; and receiving, by the WTP, an authentication success notification message corresponding to the access request sent by the access device through the CAPWAP data tunnel.

9. The method of claim 1, further comprising:

determining, by the WTP, that the CAPWAP data tunnel is connected; and thereafter, sending, by the WTP, a data packet from a terminal to the access device through an established CAPWAP data tunnel; or determining, by the WTP, that the CAPWAP data tunnel is not connected; and sending, by the WTP, a data packet from the access device to the terminal through the established CAPWAP data tunnel when the CAPWAP data tunnel is connected.

10. The method of claim 9, further comprising:

receiving, by the WTP, an access request sent by the terminal;

sending, by the WTP, the access request to the access device through the CAPWAP data tunnel; and receiving, by the WTP, an authentication success notification message corresponding to the access request sent by the access device through the CAPWAP data tunnel.

11. A non-transitory computer-readable medium storing instructions that, when executed by a-wireless termination point (WTP), cause the WTP to perform operations comprising:

obtaining an address of an access control point (AC) and an address of an access device, where the access device is used to perform access authentication on a terminal device when the access device receives, through the WTP, an access request sent by the terminal device;

using the address of the AC to establish a control and provisioning of wireless access points protocol (CAPWAP) control tunnel with the AC; and using the address of the access device to establish a CAPWAP data tunnel with the access device.

12. The computer-readable medium of claim 11, wherein the operations further comprises:

sending a first keep alive packet to the AC through the CAPWAP control tunnel according to a first preset period;

determining whether a response packet to the first keep alive packet is received from the AC within a specific period; and determining that the CAPWAP control tunnel is connected if received within the specified time, otherwise;

determining that the CAPWAP control tunnel is not connected if not; and when the CAPWAP control tunnel is not connected, controlling not to exchange control management information with the AC through the CAPWAP control tunnel and controlling not to send a data packet to the access device through the CAPWAP data tunnel.

13. The computer-readable medium of claim 11, wherein the operations further comprises:

sending a second keep alive packet to the access device through the CAPWAP data tunnel according to a second preset period;

determining whether a response packet to the second keep alive packet is received from the access device within a specific period; and determining that the CAPWAP data tunnel is connected if received within the specified time, otherwise;

determining that the CAPWAP data tunnel is not connected if not; and controlling not to send a data packet to the access device through the CAPWAP data tunnel when the CAPWAP data tunnel is not connected.

14. The computer-readable medium of claim 13, wherein the operations further comprises:

when the CAPWAP data tunnel is connected, sending a data packet from a terminal to the access device through the established CAPWAP data tunnel; and sending a data packet from the access device to the terminal through the established CAPWAP data tunnel.

15. The computer-readable medium of claim 11, wherein the operations further comprises:

broadcasting a dynamic host configuration protocol discover (DHCP Discover) message; receive dynamic host configuration protocol offer (DHCP Offer) messages sent by multiple dynamic host configuration protocol (DHCP) servers;

sending a dynamic host configuration protocol request (DHCP Request) message to a DHCP server selected by the WTP; and a dynamic host configuration protocol acknowledge (DHCP ACK) message sent by a selected DHCP server, wherein a DHCP Offer message comprises an AC address and an access device address that are corresponding to a DHCP server, the DHCP ACK message comprises the AC address and access device that are corresponding to the DHCP server, or both; and selecting a DHCP server for managing the WTP from the multiple DHCP servers after the WTP receives the DHCP Offer messages sent by the multiple DHCP servers.

* * * * *